US006679988B2

(12) United States Patent
Gsell

(10) Patent No.: US 6,679,988 B2
(45) Date of Patent: Jan. 20, 2004

(54) APPARATUS FOR PRODUCING USP OR WFI PURIFIED WATER

(75) Inventor: George V. Gsell, New Orleans, LA (US)

(73) Assignee: Mechanical Equipment Company, Inc., New Orleans, LA (US)

( * ) Notice: Subject to any disclaimer, the term of this patent is extended or adjusted under 35 U.S.C. 154(b) by 100 days.

(21) Appl. No.: 10/043,021

(22) Filed: Jan. 9, 2002

(65) Prior Publication Data

US 2003/0127381 A1 Jul. 10, 2003

(51) Int. Cl.$^7$ ............... B01D 1/26; B01D 61/14; C02F 1/44; C02F 5/00
(52) U.S. Cl. ............ 210/181; 210/202; 210/206; 210/259; 210/321.6; 210/500.42; 210/500.43; 210/900
(58) Field of Search ............... 210/181, 198.1, 210/202, 206, 252, 259, 321.6, 900, 908, 500.42, 500.43

(56) References Cited

U.S. PATENT DOCUMENTS

| | | | |
|---|---|---|---|
| 3,276,458 A | * 10/1966 | Iversen et al. | ............ 134/57 R |
| 3,710,944 A | 1/1973 | Budesheim | |
| 3,870,033 A | 3/1975 | Faylor et al. | |
| 4,636,307 A | 1/1987 | Inoue et al. | |
| 5,250,183 A | * 10/1993 | Sawada et al. | ............ 210/652 |
| 5,422,013 A | 6/1995 | Hirofuji | |
| 5,683,916 A | * 11/1997 | Goffe et al. | ............ 436/535 |
| 5,922,203 A | * 7/1999 | Tomaschke | ............ 210/500.37 |
| 6,258,278 B1 | 7/2001 | Tonelli et al. | |
| 6,398,965 B1 | * 6/2002 | Arba et al. | ............ 210/652 |

* cited by examiner

Primary Examiner—Fred G. Prince
(74) Attorney, Agent, or Firm—Wood, Phillips, Katz, Clark & Mortimer

(57) ABSTRACT

An improved water purification system for production of USP purified water and/or USP water for injection include backwashable, chlorine tolerant microfilter or ultrafilter for initial filtration of the feed water (10). The filtrate from the filter (18) is provided to a dechlorinator (18) prior to being subjected to an optional, reverse osmosis membrane unit (60) and then to a still (66) which discharges purified water at USP standards for purified water or water for injection.

10 Claims, 1 Drawing Sheet

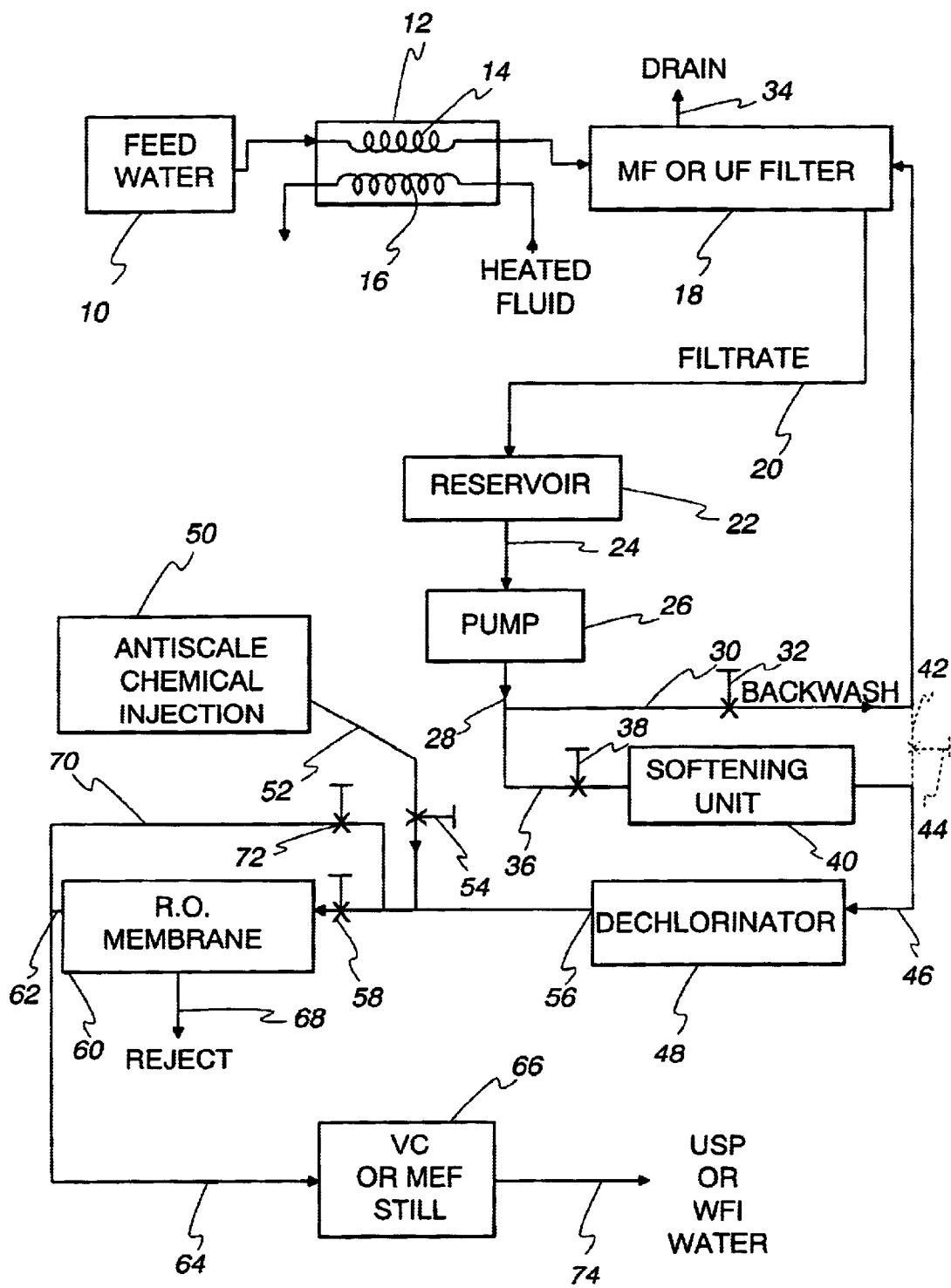

APPARATUS FOR PRODUCING USP OR WFI PURIFIED WATER

FIELD OF THE INVENTION

This invention relates to a water purification system, and more particularly, to a system that produces water meeting the standards of the United States Pharmacopoeia (USP) for purified water (USP purified water) or water for injection (USP WFI).

BACKGROUND OF THE INVENTION

The pharmaceutical industry requires considerable quantities of water of high purity such as USP purified water and USP water for injection. The standards for each are well known but in general, USP purified water must be obtained from water which meets Environmental Protection Agency "drinking water" standards or comparable standards of the European Union or Japan. It must not contain any added substances and must be obtained by a suitable process and meet certain requirements relating to electrical conductivity as the electrical conductivity of water increases with the increasing presence of ions of various sorts, indicating impurities.

USP water for injection must meet all of the requirements of USP purified water. Further, it must be obtained by distillation or reverse osmosis and meet the requirements of the Bacterial Endotoxin test and contain no more than 0.25 Endotoxin units per milliliter. It must be prepared by a suitable method and apparatus so as to minimize microbial growth.

Systems utilized heretofore to produce such water are relatively complex, have a high microbial load and a relatively low purified water recovery rate. Many are approved only for USP purified water production and not approved for the production of water for injection. Depending upon the system, organic and microbial bioburden may be present throughout until the water to be purified is subject to heating in a distilling step. This can result in a high organic load and bioburden on the distillation apparatus. Where it is desired to reduce the bioburden on the distilling apparatus one may use a reverse osmosis purification step prior to the distilling step. While this may produce some improvement, the reverse osmosis membrane is subject to biofouling.

The systems also typically employ cartridge filters, multimedia filters and/or carbon filters. Multimedia filters typically remove suspended matter down to only about 20–30 microns and carbon filters having a high bio-growth rate and require regular sanitization which increases system maintenance costs.

Consequently, there is a real need for a simplified water purification capable of providing purified water to USP purified water or USP water for injection standards, and specifically a system that is relatively simple in construction and operation and which avoids high organic load and bioburden when distilling and which minimizes the potential for high biogrowth rates at various points in the system.

SUMMARY OF THE INVENTION

It is the principal object of the invention to provide a new and improved apparatus for purifying water to USP standards for purified water and/or water for injection. It is also an object of the invention to provide a new and improved method for purifying water to such standards.

According to one embodiment of the invention, an apparatus includes a filter connected for receiving feed water meeting USP standards. The filter is a microfilter or an ultrafilter having a nominal pore size of about 0.1 microns or less to be capable of removing bacteria and organic matter from the feed water. A dechlorinator receives filtrate from the filter and removes chlorine therefrom. The dechlorinator provides feed water to a vapor compression or multiple effect still which in turn distills the filtrate to a purity meeting USP requirements for purified water or water for injection.

In a preferred embodiment, a heat exchanger is adapted to receive the feed water to be purified to preheat the same to a predetermined temperature prior to its application to the microfilter or ultrafilter.

One embodiment of the invention contemplates the provision of a filtrate reservoir connected to the filter for receiving filtrate therefrom and that the filter be a backwashable filter. A backwash line is connected to the reservoir to receive filtrate from the reservoir and direct the filtrate in reverse flow through the filter to backwash the filter when required.

In one embodiment of the invention, there is further included a reverse osmosis membrane unit interposed between the still and the dechlorinator.

An embodiment of the invention also contemplates the provision of a filtrate treating anti-scalant device upstream of the still for treating filtrate so as to eliminate or minimize scaling within the still.

In one embodiment, the anti-scalant device is a water softening device located upstream of the dechlorinator and downstream of the reservoir.

In another embodiment of the invention, the filtrate treating anti-scalant device is a chemical injector for injecting anti-scaling chemicals into the filtrate downstream of the dechlorinator.

Other objects and advantages of the invention will become apparent from the following specification taken in connection with the accompanying drawings.

DESCRIPTION OF THE DRAWINGS

The FIGURE is a schematic illustrating the components of an apparatus made according to the invention as well as the steps taken in purifying water to USP standards according to the method of the invention.

DESCRIPTION OF THE PREFERRED EMBODIMENT

According to the invention, bacteria and/or organics, and in many cases, viruses, are removed from the feed water from which the purified water is obtained in an extremely early stage in the processing which is in contrast to prior art systems. At the same time, since the feed water stream will typically be chlorinated, dechlorination of the stream does not take place until late in the process so that the sterilizing benefits of chlorination are present throughout much of the process and serve to minimize or eliminate bio growth in various system components that are located upstream of the dechlorinator.

The bacteria that are removed are typically singled celled microorganisms that are measured in high purity water by several means. The measurement is typically reported as colony forming units (CFU), or colonies per milliliter or per liter. Bacteria in the water act as particle contamination on the surface of the product in pharmaceutical applications or as a source of detrimental byproducts known as pyrogens.

As noted above, organics are also removed early in the process. Organics is basically a short hand name for organic chemicals which generally include any compounds that contain carbon but which is not carbonate related or a cyanide. Organics almost always include hydrogen and oxygen content is very common along with nitrogen sulphur and halogens such as chlorine and bromine as well.

As alluded to above, pyrogens are detrimental byproducts of processes of this sort. They are trace organics which are used as markers for bacterial growth or contamination. They are produced by various bacteria and fungi. Critical pharmaceutical processes have restrictions on contamination by pyrogens, usually at or near the limit of detection. The pyrogens are primarily polysaccaride in nature and act as fever producing substances when administered to humans and other animals.

Viruses are a large group of infectious agents generally ranging from 10 to 250 nanometers in diameter, composed of a protein sheet surrounding a nucleic acid core. They are capable of infecting animals, plants and bacteria and are typically characterized by the total dependence on living cells for reproduction and by lack of any independent metabolism. Desirably, viruses are removed at an early stage in the purification method according to the invention but in some cases, their removal or destruction may occur late in the process.

Referring now to the drawing, the system requires a source of feed water 10. In the usual case, the feed water will be chlorinated feed water as might be obtained from a municipal water supply and which meets the requirements of the Environmental Protection Agency, or equivalent standards set by the European Union or Japan. The feed water is directed to a heat exchanger 12, and specifically a flow path 14 therethrough which is in heat exchange relation with another flow path 16 which receives heated fluid from a suitable source. For example, steam or hot water may be used.

In the usual case, the heat exchanger 12 is employed to heat the feed water to a relatively constant, predetermined temperature. The particular temperature is not of particular moment except that it should not be so high as to have the potential for damaging system components and should not be so low that it materially detracts from the efficiency of subsequent operations in the system.

The main point of the heat exchanger 12, as mentioned previously, is to provide a relatively constant temperature since it is contemplated, though not shown in the drawings, that various sensing or observation operations will take place throughout the apparatus to monitor flow or the like. To eliminate feed water temperature as a variable that could cause changes in flow, constant temperature of the incoming feed water is desirable.

The feed water exits the heat exchanger 12 to enter a filter unit 18. The filter unit is a chlorine tolerant filter unit and one which may be backwashed. The filter 18 will also be a microfilter or an ultrafilter. When a microfilter, it will have a nominal pore size of about 0.1 microns or less and employ a membrane that preferably is formed of polyvinylidene.

If an ultrafilter, it will have a nominal pore size smaller than that of a microfilter and of about 80,000 Daltons MWCO (molecular weight cut off) or less. Typically, but not always, the ultrafilter will be a polyacrilonitrile filter.

Filters of these sorts are available from the Pall Corporation, 2200 Northern Boulevard, East Hills, N.Y. 11548-1289.

When the filter 18 is a microfilter, it will remove all suspended particles from the water including high molecular weight organics and bacteria. On the other hand, when the filter 18 is an ultrafiltration filter, it will remove all suspended particles from water including high and low molecular weight organics, bacteria and, in addition, viruses.

An exit line 20 for filtrate leaving the filter 18 extends from the filter 18 to a reservoir 22 where the filtrate is accumulated to some degree. The reservoir can be of any desired material that will not leach into the filtrate and which is not subject to allowing or fostering microbial growth.

The reservoir 22 has an exit line 24 which extends to one or more pumps 26. The pumps pump filtrate from the reservoir 22 at an elevated pressure on an exit line 28. One branch 30 of the exit line 28 includes a control valve 32 and is a backwash line for the filter 18. Stated another way, when the valve 32 is opened, filtrate from the reservoir 22 may be pumped by the pump 26 to the filter 18 to backwash the same. The backwashing liquid exits the filter 18 to a system drain 34.

The pump discharge 28 also extends to a line 36 including a control valve 38 on the inlet side of a water softening unit 40 of conventional construction. The water softening unit is employed to remove metallic ions from the filtrate stream as, for example, calcium ions as well as other mineral that would tend to cause scaling in a still. In some instances, the softening unit 40 may be omitted in favor of an anti-scale chemical injection system to be described hereinafter.

If desired, the lines 30 and 36 may be connected at a location downstream of the softening unit as shown by a line 42 with a control valve 44. In some instances, it may be desirable to backwash the filter 18 with softened water and when such is the case, the valve 32 may be closed with the valves 38 and 44 open to achieve the desired backwashing. Generally, there is little to be gained by backwashing the filter 18 with soft water so that the line 42 and valve 44 will be used infrequently, if at all. Alternatively, in lieu of the reservoir 22 a second filter 18 could be placed in hydraulic parallel with filter 18 to provide backwash water.

The outlet of the softening unit 40 feeds the softened filtrate on a line 46 to the inlet of a dechlorinator 48. Preferably, the dechlorinator is an ultraviolet light dechlorinator. Dechlorinators of this sort are available from, for example, the Aquafine Corp., 29010 Avenue Paine, Valencia, Calif. 91355-4198 or Aquionics, 21 Kenton Land Road, Erlanger, Ky. 41018.

However, other types of dechlorinators that do not utilize ultraviolet light may be used as the dechlorinator 48. For example, an activated carbon dechlorinator could be used. Alternatively, sodium bisulfite injection may be employed as well.

As alluded to previously, if desired, the softening unit 40 may be dispensed with in favor of chemical injection of an anti-scaling chemical. A conventional such injector is illustrated at 50 and anti-scale chemical compositions can be injected on a line 52 through a control valve 54 to the outlet side 56 of the dechlorinator.

Dechlorinated filtrate together with added chemical, if any, may be passed through a control valve 58 to a conventional reverse osmosis membrane unit 60. Permeate from the membrane unit 60 exits at a conduit 62 and is directed by a line 64 to a still 66.

That part of the feed water stream that does not pass through the membrane within the unit 60 is rejected as indicated schematically at 68.

The requisite pressure differential across the membrane within the unit 60 to cause reverse osmosis to occur is provided by the pump 26.

In some instances, the reverse osmosis membrane unit 60 may be eliminated altogether or, if desired, a bypass for the reverse osmosis membrane unit 60 may be provided. Such a bypass is shown as a conduit 70 extending from the downstream end 56 of the dechlorinator 48 through a control valve 72 through the permeate outlet 62 of the membrane unit 60 and the line 64.

In some cases, the presence of the reverse osmosis membrane unit 60 is preferred in terms of its being able to provide some flexibility in the choice of the still 66. When the membrane unit 60 is employed, the still 66 will typically be the conventional vapor compression or conventional multiple effect still. Conversely, when the reverse osmosis membrane unit 60 is omitted altogether or when substantial use of the bypass 70 is contemplated, more usually, the still 66 will be a vapor compression still.

In any event, the output of the still is purified water provided on a line 74.

From the foregoing, it will be appreciated that the invention removes organic and biological burden from the purification system early in the purification process through the use of a microfiltration or ultrafiltration membrane. Consequently, organic loading and bioburden is minimized early on to promote system efficiency by eliminating it as a load on the RO membrane 60 if used or on the still 66 if the RO membrane 60 is not used. Further, the system operates in an extremely sterile matter since the biological burden is reduced because of the presence of chlorine in the feed water throughout the upstream part of the system and through the application of heat by the still in the downstream part of the apparatus. Organics which provide a source of food for bacteria and result in pyrogen formation are rejected in the microfilter or ultrafilter prior to the feed water entering the remainder of the system and the system typically has an increase on the order of 20%–25% in recovery of purified water from the feed water. All of this prevents substantial biogrowth that may occur within conventional systems wherein multi-media filters, carbon filters, water softeners containing porous resins as well as semi-permeable reverse osmosis membranes which can provide breeding grounds for bacteria.

At the same time, the system is relatively simple in that the use of backwashable, chlorine tolerant micro or ultrafiltration membranes eliminates the need for multi-media filters or cartridge filtration. As a consequence of the elimination of these components, downstream components operate more efficiently and in a more sterile environment due to the higher level of initial filtration.

What is claimed is:

1. Apparatus for purifying water to USP or WFI purification standards, consisting essentially of:

a chlorine tolerant ultra filtration or micro filtration filter unit having the capability of removing bacteria from a chlorinated feed water stream;

a dechlorination unit connected to said filter unit for receiving filtrate therefrom;

a vapor compression or multiple effect still connected to said dechlorination unit for distilling the filtrate to produce purified water at USP or WFI purification standards; and a water softening system located connected between said filter unit and said dechlorination unit to remove scale causing constituents from said filtrate.

2. The apparatus of claim 1 wherein said filter is a microfiltration filter having a nominal pore size of about 0.1 microns or less.

3. The apparatus of claim 2 wherein said filter is a polyvinylidene filter.

4. The apparatus of claim 1 wherein said filter is an ultra filtration filter having a nominal pore size of about 80,000 Dalton MWCO or less.

5. The apparatus of claim 4 wherein said filter is a polyacrilonitrile filter.

6. Apparatus for purifying water to USP or WFI purification standards, consisting essentially of:

a chlorine tolerant ultra filtration or micro filtration filter unit having the capability of removing bacteria from a chlorinated feed water stream;

a dechlorination unit connected to said filter unit for receiving filtrate therefrom;

a vapor compression or multiple effect still connected to said dechlorination unit for distilling the filtrate to produce purified water at USP or WFI purification standards;

a reverse osmosis unit connected between said dechlorination unit and said still; and an anti-scale chemical injection unit connected between said dechlorination unit and said reverse osmosis unit.

7. The apparatus of claim 6 wherein said filter is a microfiltration filter having a nominal pore size of about 0.1 microns or less.

8. The apparatus of claim 7 wherein said filter is a polyvinylidene filter.

9. The apparatus of claim 6 wherein said filter is an ultra filtration filter having a nominal pore size of about 80,000 Dalton MWCO or less.

10. The apparatus of claim 9 wherein said filter is a polyacrilonitrile filter.

* * * * *